(12) United States Patent
Park et al.

(10) Patent No.: US 8,902,411 B2
(45) Date of Patent: Dec. 2, 2014

(54) 3-DIMENSIONAL IMAGE ACQUISITION APPARATUS AND METHOD OF EXTRACTING DEPTH INFORMATION IN THE 3D IMAGE ACQUISITION APPARATUS

(75) Inventors: Yong-hwa Park, Yongin-si (KR); Jang-woo You, Yongin-si (KR); Yong-chul Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 13/160,135

(22) Filed: Jun. 14, 2011

(65) Prior Publication Data

US 2012/0162197 A1 Jun. 28, 2012

(30) Foreign Application Priority Data

Dec. 23, 2010 (KR) ........................ 10-2010-0133720

(51) Int. Cl.
| | |
|---|---|
| *G01S 17/36* | (2006.01) |
| *G01S 17/89* | (2006.01) |
| *G01S 7/487* | (2006.01) |
| *G01S 17/87* | (2006.01) |
| *G01C 3/08* | (2006.01) |

(52) U.S. Cl.
CPC ............... *G01S 17/36* (2013.01); *G01S 17/87* (2013.01); *G01S 7/487* (2013.01); *G01S 17/89* (2013.01)
USPC ........................................................ 356/5.1

(58) Field of Classification Search
CPC ...................................................... G01S 17/36
USPC ........................................................ 356/5.1
See application file for complete search history.

(56) References Cited

U.S. PATENT DOCUMENTS

| | | | | |
|---|---|---|---|---|
| 3,258,766 A | * | 6/1966 | Munz ............................ | 342/180 |
| 3,676,006 A | * | 7/1972 | Velzel ............................ | 56/512 |
| 3,682,553 A | * | 8/1972 | Kapany ........................ | 356/5.04 |
| 3,772,457 A | * | 11/1973 | Macovski ..................... | 348/163 |
| 4,935,616 A | | 6/1990 | Scott et al. | |
| 5,081,530 A | | 1/1992 | Medina | |
| 5,162,861 A | * | 11/1992 | Tamburino et al. .......... | 356/5.05 |
| 5,384,573 A | * | 1/1995 | Turpin .......................... | 342/179 |
| 5,579,103 A | * | 11/1996 | Tachikawa .................... | 356/5.1 |
| 5,625,419 A | * | 4/1997 | Pyeong ......................... | 348/568 |
| 6,057,909 A | | 5/2000 | Yahav et al. | |

(Continued)

FOREIGN PATENT DOCUMENTS

| KR | 10-2010-0080092 A | 7/2010 |
|---|---|---|
| KR | 1020100084018 A | 7/2010 |

(Continued)

*Primary Examiner* — Ari M Diacou
(74) *Attorney, Agent, or Firm* — Sughrue Mion, PLLC

(57) ABSTRACT

A 3 dimensional (3D) image acquisition apparatus and a method of extracting depth information in the 3D image acquisition apparatus are provided. The method of extracting depth information includes sequentially projecting N (N is a natural number equal to or greater than 3) different pieces of projection light onto a object; modulating N pieces of reflection light reflected from the object with an optical modulation signal having a gain waveform; generating N images by capturing the N pieces of modulated reflection light; generating a first averaged image by multiplying the N images by primary weights and generating a second averaged image by multiplying the N images by secondary weights; acquiring an average phase delay from the first and second averaged images; and calculating a distance to the object from the average phase delay.

33 Claims, 8 Drawing Sheets

(56) References Cited

U.S. PATENT DOCUMENTS

| | | |
|---|---|---|
| 6,088,086 A | 7/2000 | Muguira et al. |
| 6,100,517 A | 8/2000 | Yahav et al. |
| 6,118,946 A * | 9/2000 | Ray et al. .................. 396/89 |
| 6,288,776 B1 * | 9/2001 | Cahill et al. ................ 356/5.1 |
| 6,331,911 B1 | 12/2001 | Manassen et al. |
| 6,349,174 B1 * | 2/2002 | Ray et al. .................. 396/106 |
| 6,456,793 B1 * | 9/2002 | Ray et al. .................. 396/89 |
| 6,587,186 B2 | 7/2003 | Bamji et al. |
| 6,794,628 B2 | 9/2004 | Yahav et al. |
| 6,856,355 B1 * | 2/2005 | Ray et al. .................. 348/370 |
| 6,856,382 B2 * | 2/2005 | Cahill et al. ................ 356/5.04 |
| 6,925,195 B2 * | 8/2005 | Cahill et al. ................ 382/107 |
| 7,041,968 B2 | 5/2006 | Enke et al. |
| 7,095,487 B2 | 8/2006 | Gonzalez-Banos et al. |
| 7,230,685 B2 | 6/2007 | Suzuki et al. |
| 7,433,322 B1 | 10/2008 | Alapuranen |
| 7,586,077 B2 | 9/2009 | Lehmann et al. |
| 7,796,239 B2 * | 9/2010 | Sawachi ...................... 356/5.1 |
| 7,834,925 B2 * | 11/2010 | Kim ............................ 348/335 |
| 7,880,866 B2 * | 2/2011 | Masuda ...................... 356/4.06 |
| 8,471,895 B2 * | 6/2013 | Banks .......................... 348/46 |
| 8,538,636 B2 * | 9/2013 | Breed .......................... 701/49 |
| 2002/0131033 A1 * | 9/2002 | Takada et al. ............. 356/4.01 |
| 2004/0156034 A1 * | 8/2004 | Cahill et al. ................ 356/5.04 |
| 2006/0176301 A1 * | 8/2006 | Sohn et al. ................. 345/423 |
| 2007/0288194 A1 | 12/2007 | Boillot |
| 2008/0088826 A1 * | 4/2008 | Ohyama et al. ............ 356/51 |
| 2008/0231832 A1 * | 9/2008 | Sawachi ...................... 356/5.1 |
| 2008/0246943 A1 * | 10/2008 | Kaufman et al. ............ 356/5.01 |
| 2009/0059201 A1 * | 3/2009 | Willner et al. .............. 356/5.01 |
| 2009/0079959 A1 * | 3/2009 | Masuda ...................... 356/5.1 |
| 2009/0190007 A1 * | 7/2009 | Oggier et al. ............... 348/241 |
| 2010/0053592 A1 * | 3/2010 | Yahav et al. ............... 356/4.01 |
| 2010/0128109 A1 * | 5/2010 | Banks .......................... 348/46 |
| 2010/0153062 A1 | 6/2010 | Maltseff et al. |
| 2010/0186675 A1 * | 7/2010 | Van Den Berg ........... 119/14.03 |
| 2010/0308211 A1 | 12/2010 | Cho et al. |
| 2010/0321755 A1 | 12/2010 | Cho et al. |
| 2010/0328750 A1 | 12/2010 | Kim et al. |
| 2011/0063437 A1 * | 3/2011 | Watanabe et al. ........... 348/140 |
| 2011/0176565 A1 * | 7/2011 | Hutchin ...................... 372/27 |
| 2012/0026303 A1 * | 2/2012 | Ezhov .......................... 348/54 |
| 2012/0069176 A1 * | 3/2012 | Park et al. .................. 348/135 |
| 2013/0101176 A1 * | 4/2013 | Park et al. .................. 382/106 |
| 2013/0147777 A1 * | 6/2013 | Lau et al. .................... 345/207 |
| 2013/0278713 A1 * | 10/2013 | Banks .......................... 348/36 |
| 2013/0293681 A1 * | 11/2013 | Borowski .................... 348/46 |

FOREIGN PATENT DOCUMENTS

| | | |
|---|---|---|
| KR | 1020100084842 A | 7/2010 |
| KR | 1020100130782 A | 12/2010 |
| KR | 1020100135548 A | 12/2010 |
| KR | 1020100138147 A | 12/2010 |

* cited by examiner

FIG. 7

$$\phi_{TOF}^{(AVG)} = \tan^{-1}\left(\frac{\sum_{k=1}^{N} A_k I_{CCD}^{(k)}}{\sum_{k=1}^{N} B_k I_{CCD}^{(k)}}\right)$$

Phase Shift :
N=3 (0°, 120°, 240°), N=4 (0°, 90°, 180°, 270°), N=5 (0°, 72°, 144°, 216°, 288°),
N=6 (0°, 60°, 120°, 180°, 240°, 300°), N=7 (0°, 51°, 103°, 154°, 206°, 257°, 309°),
N=8 (0°, 45°, 90°, 135°, 180°, 225°, 270°, 315°)
N=9 (0°, 40°, 80°, 120°, 160°, 200°, 240°, 280°, 320°)

| No of CCD meas. | Weight. Factors | $I_{CCD1}$ | $I_{CCD2}$ | $I_{CCD3}$ | $I_{CCD4}$ | $I_{CCD5}$ | $I_{CCD6}$ | $I_{CCD7}$ | $I_{CCD8}$ | $I_{CCD9}$ | $I_{CCD10}$ |
|---|---|---|---|---|---|---|---|---|---|---|---|
| N=3 | $A_k$ | 0 | -1 | 1 | - | - | - | - | - | - | - |
|     | $B_k$ | 1.1547 | -0.5774 | -0.5774 | - | - | - | - | - | - | - |
| N=4 | $A_k$ | 0 | -1 | 0 | 1 | - | - | - | - | - | - |
|     | $B_k$ | 1 | 0 | -1 | 0 | - | - | - | - | - | - |
| N=5 | $A_k$ | 0 | -1 | -0.6180 | 0.6180 | 1 | - | - | - | - | - |
|     | $B_k$ | 1.0515 | 0.3249 | -0.8507 | -0.8507 | 0.3249 | - | - | - | - | - |
| N=6 | $A_k$ | 0 | -1 | -1 | 0 | 1 | 1 | - | - | - | - |
|     | $B_k$ | 1.1547 | 0.5774 | -0.5774 | -1.1547 | -0.5774 | 0.5774 | - | - | - | - |
| N=7 | $A_k$ | 0 | -0.8019 | -1 | -0.4450 | 0.4450 | 1 | 0.8019 | - | - | - |
|     | $B_k$ | 1.0257 | 0.6395 | -0.2282 | -0.9241 | -0.9241 | -0.2282 | 0.6395 | - | - | - |
| N=8 | $A_k$ | 0 | -0.7071 | -1 | -0.7071 | 0 | 0.7071 | 1 | 0.7071 | - | - |
|     | $B_k$ | 1 | 0.7071 | 0 | -0.7071 | -1 | -0.7071 | 0 | 0.7071 | - | - |
| N=9 | $A_k$ | 0 | -0.6527 | -1 | -0.8794 | -0.3473 | 0.3473 | 0.8794 | 1 | 0.6527 | - |
|     | $B_k$ | 1.0154 | 0.7779 | 0.1763 | -0.5077 | -0.9542 | -0.9542 | -0.5077 | 0.1763 | 0.7779 | - |
| N=10 | $A_k$ | 0 | -0.6180 | -1 | -1 | -0.6180 | 0 | 0.6180 | 1 | 1 | 0.6180 |
|      | $B_k$ | 1.0515 | 0.8507 | 0.3249 | -0.3249 | -0.8507 | -1.0515 | -0.8507 | -0.3249 | 0.3249 | 0.8507 |

# 3-DIMENSIONAL IMAGE ACQUISITION APPARATUS AND METHOD OF EXTRACTING DEPTH INFORMATION IN THE 3D IMAGE ACQUISITION APPARATUS

CROSS-REFERENCE TO RELATED APPLICATION

This application claims priority from Korean Patent Application No. 10-2010-0133720, filed on Dec. 23, 2010, in the Korean Intellectual Property Office, the disclosure of which is incorporated herein in its entirety by reference.

BACKGROUND

1. Field

Methods and apparatuses consistent with the exemplary embodiments relate to a three-dimensional (3D) image acquisition apparatus and a method of extracting depth information in the 3D image acquisition apparatus, and more particularly, to a depth information extracting method capable efficiently removing an error due to random noise, which may be generated from a light source, an optical modulator, and an image pickup device used in a 3D image acquisition apparatus.

2. Description of the Related Art

Recently, along with the development of 3D display devices capable of displaying images having a sense of depth and an increase of demands thereof, the importance of 3D content has become an object of great interest. Accordingly, a 3D image acquisition apparatus, such as a 3D camera, by which a general user can directly produce 3D content has been researched. Such a 3D camera should obtain depth information together with conventional two-dimensional (2D) color image information.

Depth information regarding distances between surfaces of objects and a 3D camera may be obtained by using a stereo vision method using two cameras or a triangulation method using structured light and a camera. However, in these methods, as a distance of an object is far, accuracy of the depth information significantly decreases, and these methods depend on a surface state of the object, and thus it is difficult to determine accurate depth information.

A time-of-flight (TOF) method is introduced to improve the above-described problem. TOF technology is a method of measuring a light flight time from when illumination light is irradiated onto an object to when light reflected from the object is received by a light receiver. According to TOF technology, a series of processing procedures for extracting depth information, such as projecting light of a specific wavelength (e.g., a near infrared ray of 850 nm) onto an object by using an illumination optical system including a Light Emitting Diode (LED) or a Laser Diode (LD), receiving light having the same wavelength as the specific wavelength, which is reflected from the object, by a light receiver, and modulating the received light by a modulator having an already known gain wavelength, are performed. According to such a series of processing procedures, variations of the TOF technology have been introduced.

In addition, in a light processing process for extracting depth information in the TOF technology, a method of performing pulse driving of a light source and an optical modulation device, a method using a specific waveform, such as a triangular wave (e.g., a ramp waveform), or a method using a sine wave is introduced. In addition, various methods of driving the light source and the optical modulation device are introduced according to used waveforms, and various algorithms for extracting depth information from the intensity of light are introduced.

In the TOF method described above, depth information is extracted by assuming an ideal environment without noise. However, random noise always exists in an actual light source, an actual optical modulator, and an actual image pickup device, such as a Charge Coupled Device (CCD), due to various causes, such as instability of a power source, heat, and an external electromagnetic wave. The random noise causes an error in the process of extracting depth information. To remove the random noise, it is required to acquire a plurality of images within a time period of a single frame and generate a single image by averaging the plurality of images. A least square fitting method using a pseudo-inverse matrix is, for example, generally used as an algorithm of averaging a plurality of images. However, since an image pickup device, such as a CCD, has many pixels, i.e., hundreds of thousands to tens of millions of pixels, a usage amount of a memory and a computation amount may increase exponentially to use the averaging method. Alternatively, a light source, an optical modulator, and an image pickup device in which random noise is extremely restrained may be used. However, in this case, a size and a manufacturing cost of a 3D image acquisition apparatus may be significantly increased.

SUMMARY

According to an aspect of an exemplary embodiment, there is provided a depth information extracting method capable of efficiently removing an error due to random noise, which may be generated from a light source, an optical modulator, and an image pickup device used in a 3 Dimensional (3D) image acquisition apparatus.

According to another aspect of an exemplary embodiment, there is provided a 3D image acquisition apparatus for extracting depth information by using the depth information extracting method.

Additional aspects will be set forth in part in the description which follows and, in part, will be apparent from the description, or may be learned by practice of the exemplary embodiments.

According to an aspect of an exemplary embodiment, there is provided a depth information extracting method including: sequentially projecting N (N is a natural number equal to or greater than 3) different pieces of projection light onto a object; modulating N pieces of reflection light reflected from the object with an optical modulation signal having a gain waveform; generating N images by capturing the N pieces of modulated reflection light; generating a first averaged image by multiplying the N images by primary weights and generating a second averaged image by multiplying the N images by secondary weights; acquiring an average phase delay from the first and second averaged images; and calculating a distance to the object from the average phase delay.

The N different pieces of projection light may be periodic waves having the same period and having at least one of different magnitudes and different phases.

The optical modulation signal may be a periodic wave having the same period as the projection light.

For example, phase differences obtained by dividing 360 degrees by N may exist between the N pieces of reflection light.

The first averaged image may be obtained by multiplying the N images by primary weights respectively corresponding to the N images and summing the multiplication results, and the second averaged image may be obtained by multiplying the N images by secondary weights respectively corresponding to the N images and summing the multiplication results.

The primary and secondary weights may be previously calculated by using magnitudes and phases of the N pieces of projection light.

When it is assumed that $k^{th}$ primary and secondary weights corresponding to a $k^{th}$ image are $A_k$ and $B_k$, respectively, a magnitude of $i^{th}$ projection light is $a^{(i)}$, and a phase of the $i^{th}$ projection light is $\theta^{(i)}$, the $k^{th}$ primary and secondary weights may be defined by the equation below, $$A_k = \text{sum}[a^{(i)} \cos \theta^{(i)} - a^{(j)} \cos \theta^{(j)}; (i,j) \text{ is } {}_{N-1}C_2{}^{(-k)} \text{ of } \{1:N\}]$$

$$B_k = \text{sum}[a^{(i)} \sin \theta^{(i)} - a^{(j)} \sin \theta^{(j)}; (i,j) \text{ is } {}_{N-1}C_2{}^{(-k)} \text{ of } \{1:N\}],$$

wherein i and j are any individual numbers excluding k from 1 to N (i≠k, j≠k) and are defined as all combinations obtained by arranging (N−1) numbers remaining by excluding k in an ascending order (k+1, k+2, N−1, N, 1, 2, ..., k−1) circulating from a number coming next to k and selecting 2 of the (N−1) numbers in the circulated ascending order.

Combinations of a plurality of weights may be previously calculated for a plurality of combinations of magnitudes and phases of a plurality of pieces of projection light.

The generating of the first averaged image and the second averaged image may use weights of combinations corresponding to combinations of magnitudes and phases of the N pieces of projection light, which are actually used, from among the combinations of the plurality of weights.

The average phase delay may be obtained from an arctangent value of a ratio (V/U) of the first averaged image V to the second averaged image U.

The depth information extracting method may further include: additionally generating less than N new images by projecting less than N different pieces of projection light onto the object; removing first generated less than N existing images; generating first and second averaged images by multiplying the remaining N images by primary weights and secondary weights, respectively; acquiring an average phase delay from the first and second averaged images; and calculating a distance to the object from the average phase delay.

According to another aspect of an exemplary embodiment, there is provided a depth information extracting method including: sequentially projecting N (N is a natural number equal to or greater than 3) identical pieces of projection light onto a object; modulating N pieces of reflection light reflected from the object with N optical modulation signals having different gain waveforms, respectively; generating N images by capturing the N pieces of modulated reflection light; generating a first averaged image by multiplying the N images by primary weights and generating a second averaged image by multiplying the N images by secondary weights; acquiring an average phase delay from the first and second averaged images; and calculating a distance to the object from the average phase delay.

The N optical modulation signals may be periodic waves having the same period and having at least one of different magnitudes and different phases.

The N pieces of projection light may be periodic waves having the same period as the N optical modulation signals.

For example, phase differences obtained by dividing 360 degrees by N may exist between the N optical modulation signals.

The primary and secondary weights may be previously calculated by using magnitudes and phases of the N optical modulation signals.

According to another aspect of an exemplary embodiment, there is provided a 3D image acquisition apparatus including: a light source for projecting projection light onto a object; an optical modulator for modulating light reflected from the object with an optical modulation signal; an image pickup device for generating an image by capturing the light modulated by the optical modulator; and a depth image processor for calculating a distance to the object by using the image generated by the image pickup device.

The depth image processor may extract depth information in a depth information extracting method.

The 3D image acquisition apparatus may further include: a light source driver for controlling a waveform of the projection light by driving the light source; an optical modulator driver for controlling a gain waveform of the optical modulation signal by driving the optical modulator; and a controller for controlling operations of the light source driver, the optical modulator driver, and the image pickup device.

The 3D image acquisition apparatus may further include: a primary lens for concentrating reflection light into an area of the optical modulator on a light incident surface of the optical modulator; a filter for transmitting only light having a predetermined wavelength, the filter being located between the primary lens and the optical modulator; and a secondary lens for concentrating the modulated light into an area of the image pickup device, the secondary lens being located between the optical modulator and the image pickup device.

The image pickup device may use a CCD image sensor, a Complementary Metal Oxide Semiconductor (CMOS) image sensor, or a photo diode array having a 2D or one-dimensional (1D) array or use a single photo diode for measuring a distance to a single point.

Combinations of a plurality of weights previously calculated for a plurality of combinations of a plurality of pieces of projection light or magnitudes of the optical modulation signal or a plurality of combinations of the plurality of pieces of projection light or phases of the optical modulation signal may be stored in a memory of the 3D image acquisition apparatus.

When depth information is extracted, the depth image processor may read weights corresponding to combinations of magnitudes and phases of actually used projection light or optical modulation signals from the memory and use the weights to calculate the depth information.

BRIEF DESCRIPTION OF THE DRAWINGS

These and/or other aspects will become apparent and more readily appreciated from the following description of the exemplary embodiments, taken in conjunction with the accompanying drawings of which:

FIG. 7 illustrates a table showing weights calculated according to an exemplary embodiment.

DETAILED DESCRIPTION OF EXEMPLARY EMBODIMENTS

Figure 1:
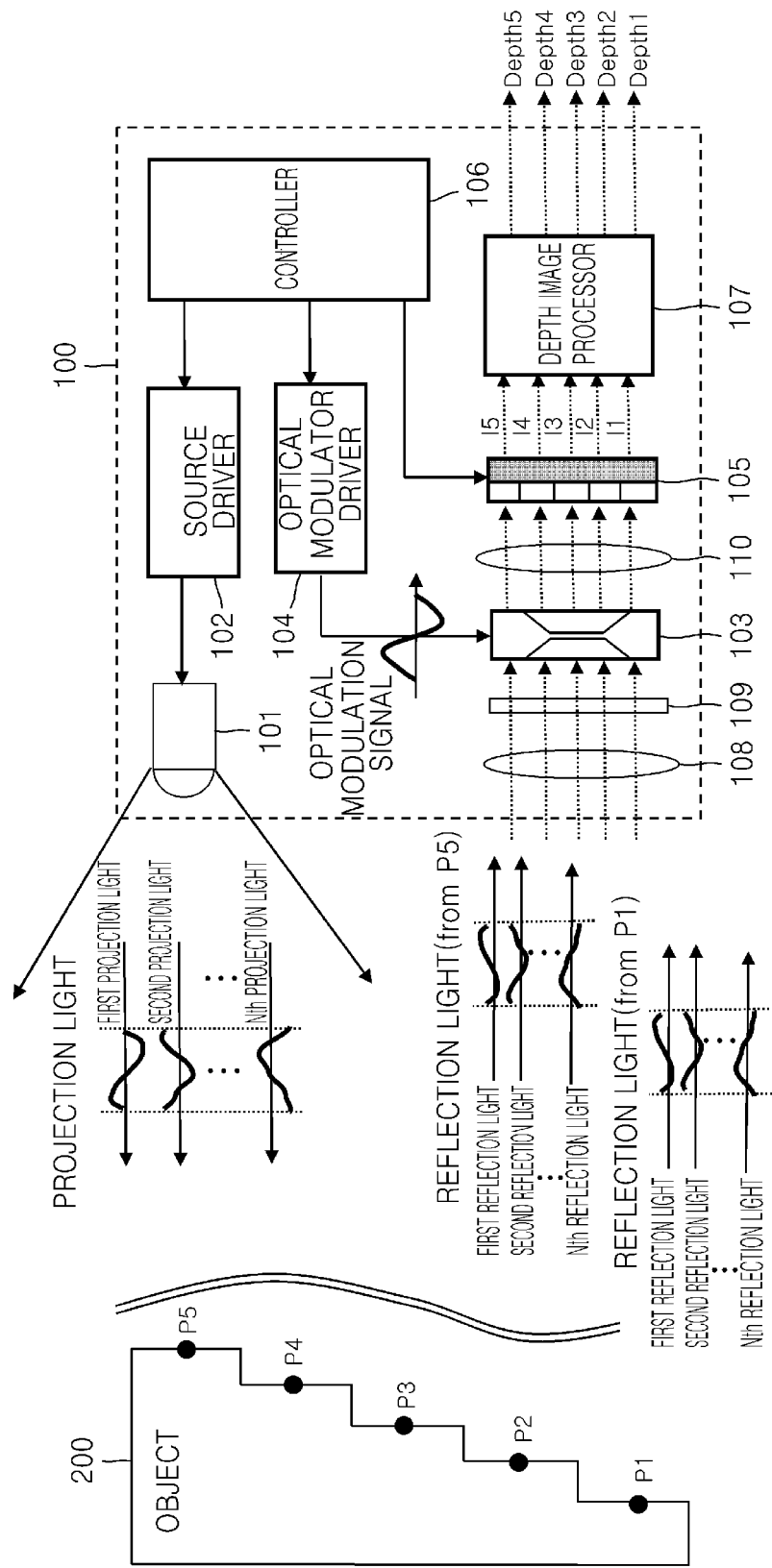
FIG. 1 is a schematic block diagram of a 3D image acquisition apparatus for extracting depth information by using a TOF method according to an exemplary embodiment.

Reference will now be made in detail to exemplary embodiments, which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description.

A 3D image acquisition apparatus and a method of extracting depth information in the 3D image acquisition apparatus will now be described more fully with reference to the accompanying drawings. In the drawings, magnitudes of elements may be exaggerated for clarity and convenience of description.

FIG. 1 is a schematic block diagram of a 3D image acquisition apparatus 100 for extracting depth information by using a time-of-flight (TOF) method. Referring to FIG. 1, the 3D image acquisition apparatus 100 may include a light source 101 for generating light having a predetermined wavelength, a light source driver 102 for driving the light source 101, an optical modulator 103 for modulating light reflected from an object 200, an optical modulator driver 104 for driving the optical modulator 103, an image pickup device 105 for generating an image from the light optical-modulated by the optical modulator 103, a depth image processor 107 for calculating depth information based on an output of the image pickup device 105, and a controller 106 for controlling operations of the light source driver 102, the optical modulator driver 104, the image pickup device 105, and the depth image processor 107. In addition, a primary lens 108 for concentrating the reflection light into an area of the optical modulator 103 and a filter 109 for transmitting only light having a predetermined wavelength may further be disposed on a light incident surface of the optical modulator 103. Furthermore, a secondary lens 110 for concentrating the optical-modulated light into an area of the image pickup device 105 may further be disposed between the optical modulator 103 and the image pickup device 105.

The light source 101 may be, for example, an LED or an LD for emitting light having a Near InfraRed (NIR) wavelength of about 850 nm, which is not seen by human eyes, for security. However, the light source 101 is not limited to a bandwidth of a wavelength and a type of the light source 101. The light source driver 102 may drive the light source 101 according to a control signal received from the controller 106 in, for example, an amplitude or phase modulation method. According to a driving signal of the light source driver 102, projection light projected from the light source 101 to the object 200 may have a form of a periodic continuous function having a predetermined period. For example, the projection light may have a specially defined waveform, such as a sine wave, a ramp wave, or a rectangular wave, or an undefined waveform having a general form.

The optical modulator 103 performs optical modulation of the light reflected from the object 200 according to a control of the optical modulator driver 104. The optical modulator driver 104 drives the optical modulator 103 according to a control signal received from the controller 106. For example, the optical modulator 103 may modulate the magnitude of the reflection light by changing a gain according to an optical modulation signal having a predetermined waveform, which is provided by the optical modulator driver 104. To do this, the optical modulator 103 has a variable gain. The optical modulator 103 may operate at a high optical modulation speed in the range of tens of MHz to hundreds of MHz to identify a phase difference or a moving time of light according to a distance. Examples of the optical modulator 103 are an image intensifier having a Multiple-Channel Plate (MCP), a GaAs series solid modulator device, and a film-type modulator device using an electro-optic substance. Although the optical modulator 103 is a transmission type in FIG. 1, a reflection-type optical modulator may be used instead.

The image pickup device 105 generates an image by detecting the reflection light that has been optical-modulated by the optical modulator 103 according to a control of the controller 106. If it is desired to measure only a distance to a certain point of the object 200, the image pickup device 105 may use a single photo sensor, e.g., a photo diode or an integrator. However, if it is desired to measure distances to a plurality of points of the object 200 at the same time, the image pickup device 105 may have a 2D or 1D array of a plurality of photo diodes or other optical detectors. For example, the image pickup device 105 may be a CCD image sensor or a CMOS image sensor having a 2D array. The depth image processor 107 calculates depth information based on an output of the image pickup device 105 according to a depth information extracting algorithm to be described later. The depth image processor 107 may be implemented by, for example, an dedicated Integrated Circuit (IC) or software installed in the 3D image acquisition apparatus 100. When the depth image processor 107 is implemented by software, the depth image processor 107 may be stored in a portable storage medium.

An operation of the 3D image acquisition apparatus 100 having the structure described above will now be schematically described.

The light source 101 sequentially projects N different pieces of projection light having a predetermined period and waveform onto the object 200 according to a control of the light source driver 102. Here, N may be a natural number equal to or greater than 3. For example, when 4 different pieces of projection light are used, the light source 101 may generate and project first projection light onto the object 200 for a time T1, generate and project second projection light onto the object 200 for a time T2, generate and project third projection light onto the object 200 for a time T3, and generate and project fourth projection light onto the object 200 for a time T4. The 4 different pieces of projection light sequentially projected onto the object 200 may have a form of a continuous function, such as a sine wave, having a specific period. For example, the first to fourth projection light may be periodic waves having the same period and waveform but having different magnitudes and phases.

The projection light projected onto the object 200 is reflected from a surface of the object 200 and incident on the primary lens 108. In general, the object 200 has a plurality of surfaces having different distances, i.e. depths, from the 3D image acquisition apparatus 100. FIG. 1 illustrates the object 200 having 5 surfaces P1 to P5 with different depths for simplification of description. When the projection light is reflected from the 5 surfaces P1 to P5 having different depths, 5 pieces of reflection light differently time-delayed (i.e., with different phases) are generated. For example, 5 pieces of first reflection light having different phases are generated when the first projection light is reflected from the 5 surfaces P1 to P5 of the object 200, 5 pieces of second reflection light having different phases are generated when the second projection light is reflected from the 5 surfaces P1 to P5 of the object 200, and likewise, 5 pieces of Nth reflection light having different phases are generated when Nth projection light is reflected from the 5 surfaces P1 to P5 of the object 200. The reflection light reflected from the surface P1 farthest from the 3D image acquisition apparatus 100 arrives at the primary lens 108 after a time delay of $\Phi_{P1}$, and the reflection light reflected from the surface P5 nearest from the 3D image acquisition apparatus 100 arrives at the primary lens 108 after a time delay of $\Phi_{P5}$, which is less than $\Phi_{P1}$.

The primary lens 108 focuses the reflection light into the area of the optical modulator 103. The filter 109 for transmitting only light having a predetermined wavelength may be disposed between the primary lens 108 and the optical modulator 103 to remove background light or diffusion light excluding a used wavelength. For example, when the light source 101 emits light having an NIR wavelength of about 850 nm, the filter 109 may be an NIR band pass filter for transmitting a band of the NIR wavelength of about 850 nm. Thus, for the light incident on the optical modulator 103, light emitted from the light source 101 and reflected from the object 200 may be dominant. Although the filter 109 is disposed between the primary lens 108 and the optical modulator 103 in FIG. 1, positions of the primary lens 108 and the filter 109 may be exchanged. For example, NIR light first transmitted through the filter 109 may be focused to the optical modulator 103 by the primary lens 108.

The optical modulator 103 modulates the reflection light by using an optical modulation signal having a predetermined waveform. A period of a gain waveform of the optical modulator 103 may be the same as a period of a waveform of the projection light. In the example shown in FIG. 1, the optical modulator 103 may perform optical modulation of the 5 pieces of first reflection light reflected from the 5 surfaces P1 to P5 of the object 200 and provide the 5 pieces of optical-modulated first reflection light to the image pickup device 105 and sequentially perform optical modulation of the 5 pieces of second reflection light to the 5 pieces of Nth reflection light and sequentially provide the 5 pieces of optical-modulated second reflection light to the 5 pieces of optical-modulated Nth reflection light to the image pickup device 105.

The modulated light of which a magnitude is modulated by the optical modulator 103 is magnification-adjusted and refocused by transmitting through the secondary lens 110 and arrives at the image pickup device 105. Thus, the modulated light is concentrated into the area of the image pickup device 105 by the secondary lens 110. The image pickup device 105 generates an image by receiving the modulated light for a predetermined exposure time. For example, the image pickup device 105 generates a first image by receiving the 5 pieces of first reflection light, which are reflected from the 5 surfaces P1 to P5 of the object 200 and modulated, for the predetermined exposure time as shown in part (A) of FIG. 2. Thereafter, the image pickup device 105 generates a second image by receiving the 5 pieces of second reflection light, which are reflected from the 5 surfaces P1 to P5 of the object 200 and modulated, for the predetermined exposure time as shown in part (B) of FIG. 2. After repeating the above-described procedures, finally, the image pickup device 105 generates an Nth image by receiving the 5 pieces of Nth reflection light, which are reflected from the 5 surfaces P1 to P5 of the object 200 and modulated, for the predetermined exposure time as shown in part (C) of FIG. 2. In this method, N different images may be sequentially acquired as shown in part (D) of FIG. 2. These acquired first to Nth images may be sub-frame images for generating a frame of image. For example, if it is assumed that a period of a frame is Td, an exposure time of the image pickup device 105 to acquire each of the N first to Nth images may be about Td/N.

Figure 2:
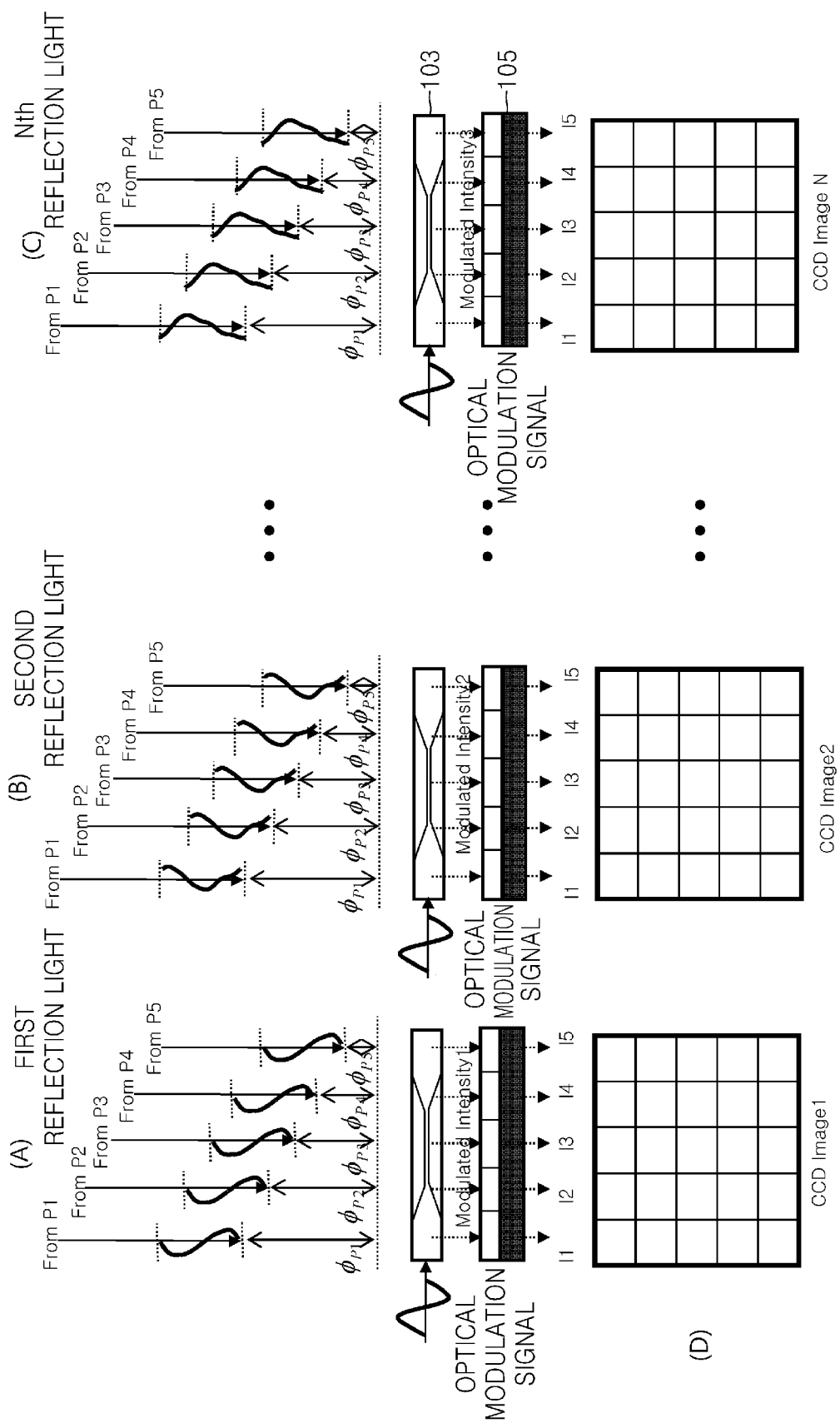
FIG. 2 illustrates a process of generating N different images in an image pickup device after modulating N different pieces of reflection light according to an exemplary embodiment.

Referring to part (A) of FIG. 2, in a first sub-frame, the 5 pieces of first reflection light are generated by reflecting the first projection light projected from the light source 101 to the object 200 on the 5 surfaces P1 to P5 of the object 200. The 5 pieces of first reflection light are modulated by the optical modulator 103 and arrive at the image pickup device 105. FIG. 2 shows for convenience of description that the image pickup device 105 has only 5 pixels respectively corresponding to the 5 surfaces P1 to P5. Thus, the 5 pieces of first reflection light are respectively incident on the 5 pixels. As shown in part (A) of FIG. 2, the 5 pieces of first reflection light reflected form the 5 surfaces P1 to P5 have different phase delays $\Phi_{P1}$ to $\Phi_{P5}$ according to the distances from the 3D image acquisition apparatus 100 to the 5 surfaces P1 to P5, respectively. The image pickup device 105 may generate the first image by capturing the first reflection light for the exposure time of, for example, about Td/N. In the same method, the second to Nth images for a second sub-frame to an Nth sub-frame may be generated. As shown in parts (B) and (C) of FIG. 2, in each of the second to Nth sub-frames, the different phase delays $\Phi_{P1}$ to $\Phi_{P5}$ also occur from the 5 surfaces P1 to P5 having different depths.

Figure 3:
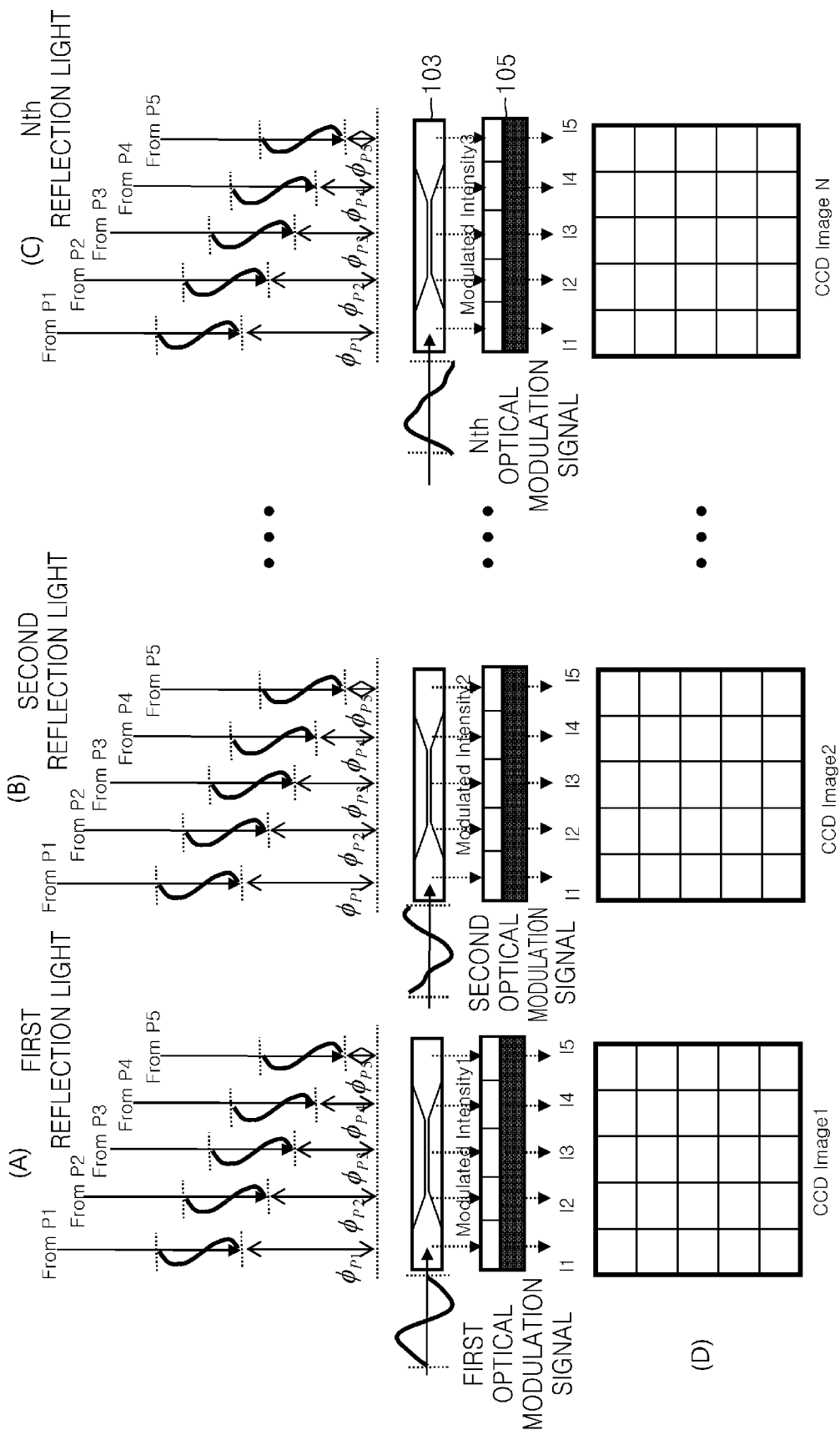
FIG. 3 illustrates a process of generating N different images by using the same projection light and N different optical modulation signals according to another exemplary embodiment.

In FIG. 2, a case of generating the N different images by using the N different pieces of projection light and reflection light has been described. However, the same projection light may be used for all sub-frames, and the optical modulator 103 may modulate reflection light by using different gain waveforms for corresponding sub-frames. FIG. 3 illustrates a process of generating N different images by using the same projection light and N different gain waveforms. Referring to FIG. 3, the reflection light reflected from the object 200 has the same waveform and phase for all sub-frames. The reflection light of each sub-frame has the different phase delays $\Phi_{P1}$ to $\Phi_{P5}$ according to the surfaces P1 to P5 of the object 200 as described above. As shown in parts (A) to (C) of FIG. 3, the optical modulator 103 modulates the reflection light by using a first optical modulation signal for a first sub-frame, modulates the reflection light by using a second optical modulation signal different from the first optical modulation signal for a second sub-frame, and modulates the reflection light by using an Nth optical modulation signal different from the other optical modulation signals for an Nth sub-frame. Here, the first to Nth optical modulation signals may have different waveforms or have the same period and waveform but with different phases. Accordingly, as shown in part (D) of FIG. 3, different first to Nth images may be acquired.

Figure 4:
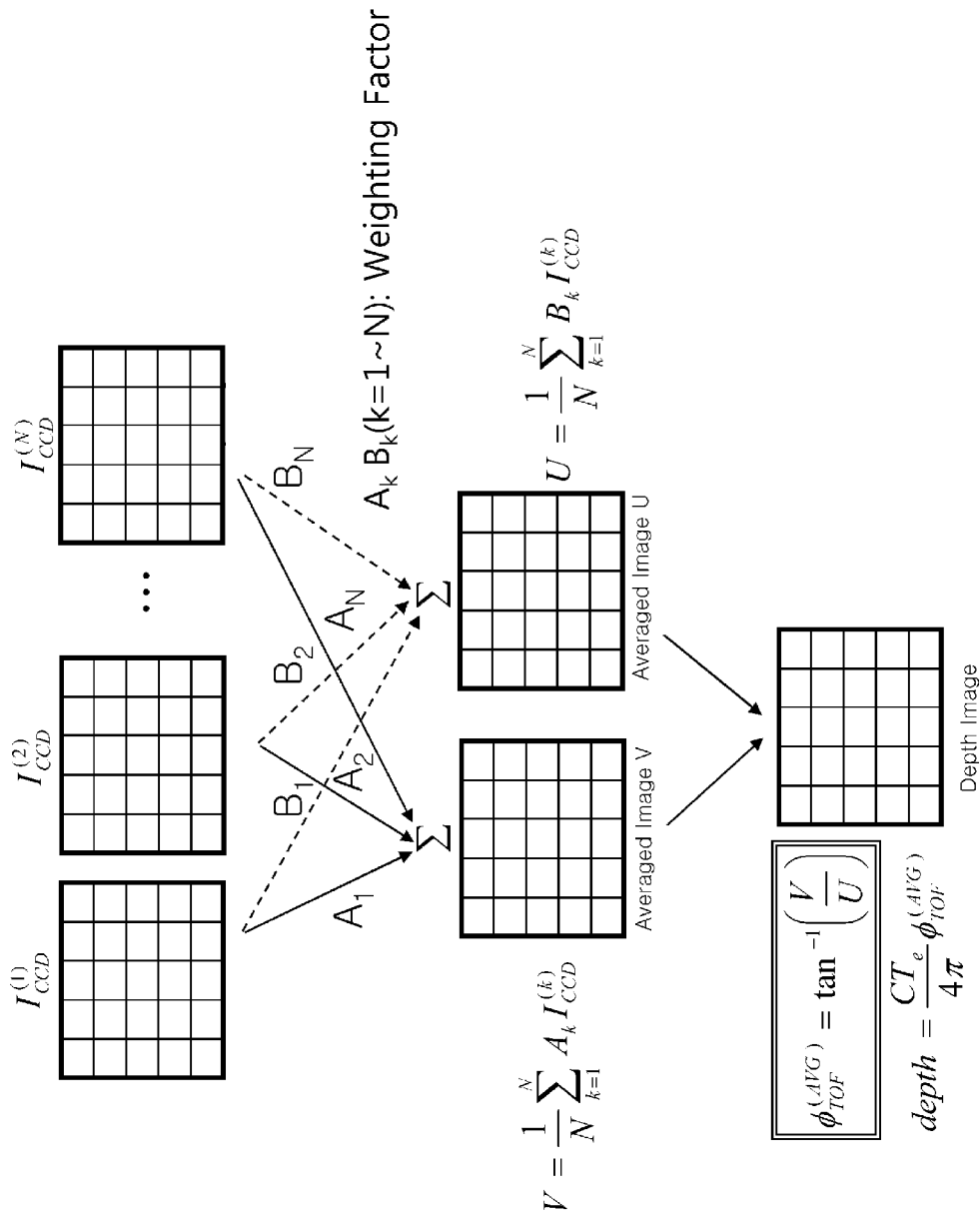
FIG. 4 illustrates a process of extracting depth information from N different images, according to an exemplary embodiment.

The N images acquired in the above-described method are delivered to the depth image processor 107. The depth image processor 107 may extract depth information by using the N images according to an algorithm to be described later. FIG. 4 illustrates a process of extracting depth information from N different images, according to an exemplary embodiment. For example, as shown in FIG. 4, a first averaged image V is generated by respectively multiplying the N images by weights $A_1$ to $A_N$ and averaging the weighted images. A second averaged image U different from the first averaged image V is generated by respectively multiplying the same N images by weights $B_1$ to $B_N$ and averaging the weighted images. As shown in the algorithm to be described later, an average phase delay may be obtained from an arctangent value (arctan= $\tan^{-1}$) of a ratio (V/U) of the first averaged image V to the second averaged image U, and depth information may be obtained from the average phase delay. In addition, as described later, optimal values of the weights $A_1$ to $A_N$ and $B_1$ to $B_N$ may be previously calculated according to the number N of images. Thus, according to an exemplary embodiment, correct depth information without random noise can be obtained by a weighted averaging method using only simple multiplication and addition computations without performing a complex averaging algorithm.

Figure 5:
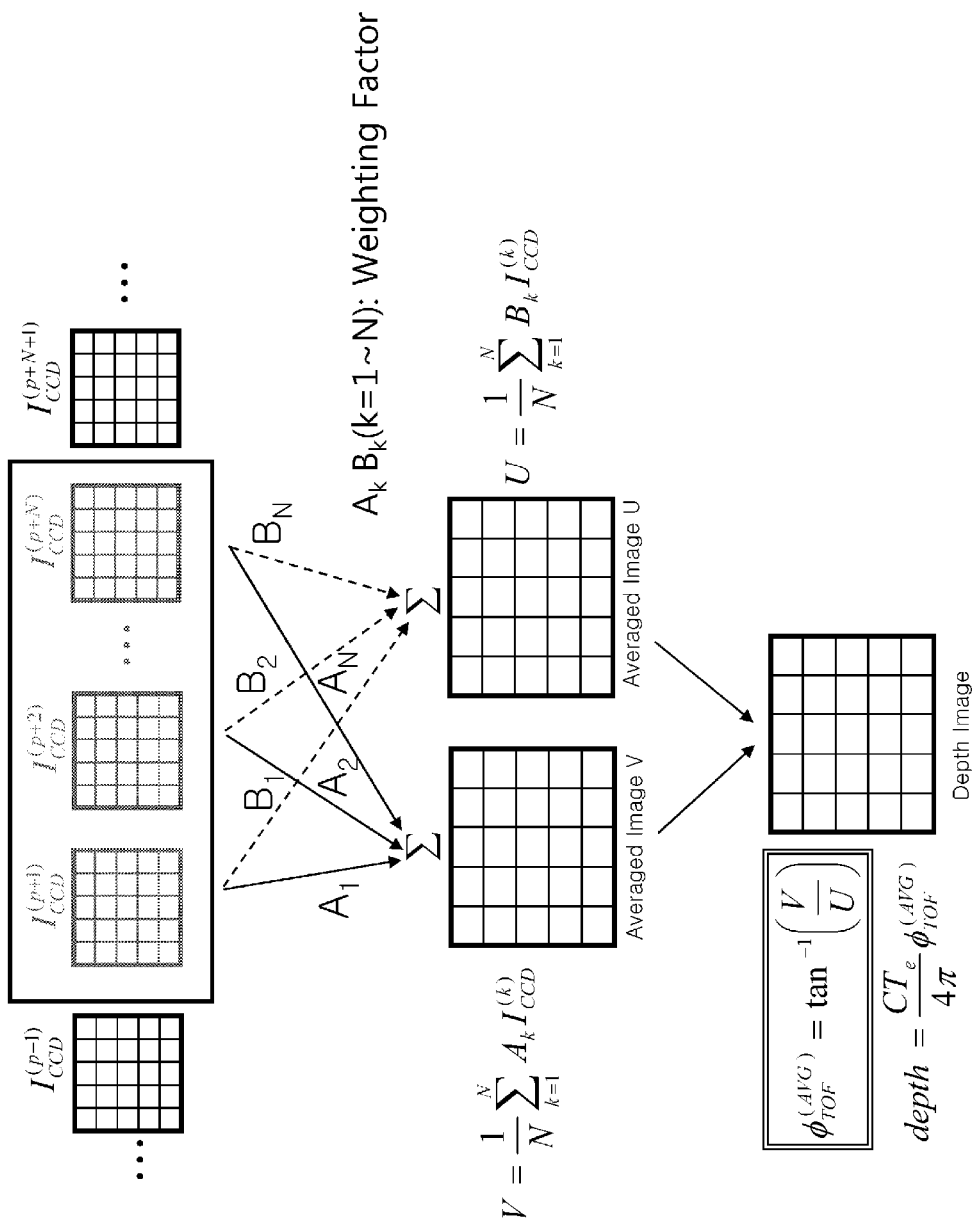
FIG. 5 illustrates a process of extracting depth information from N different images, according to another exemplary embodiment.

The exemplary embodiment shown in FIG. 4 shows a method of extracting depth information of a frame of image after acquiring all of N sub-frame images and extracting depth information of a next frame of the image after acquiring all of N new sub-frame images. However, according to another exemplary embodiment, depth information may be updated in every sub-frames. For example, referring to FIG. 5, a method of extracting depth information from N images acquired from first N sub-frames is the same as the method shown in FIG. 4. Thereafter, if an (N+1)th image is acquired from an (N+1)th sub-frame, depth information may be newly extracted in the above-described weighted averaging method by using second to (N+1)th images after removing a first image. Likewise, if an (N+2)th image is acquired from an (N+2)th sub-frame, depth information may be newly extracted by using third to (N+2)th images after removing the second image. As shown in FIG. 5, new depth information may be extracted for every sub-frames while maintaining N images in a memory (not shown) in a First In First Out (FIFO) method. Although existing images are removed one by one while new images are added one by one in FIG. 5, a plurality of images may be added while an identical number of images are removed. For example, a total of N images may be maintained by adding new images less than N and removing an identical number of oldest images.

A detailed algorithm of extracting depth information in the depth image processor 107 by using the N images will now be described.

The theoretical description below is described based on the exemplary embodiment in which the light source 101 projects the N different pieces of projection light onto the object 200 and the optical modulator 103 uses the same optical modulation signal as shown in FIG. 2. However, the theoretical description below may also be applicable to a case of using the same projection light and the N different optical modulation signals. In addition, even if an output of the image pickup device 105 is a 2D array image, since the same depth information extracting method is applied to each pixel, only a method applied to a single pixel is described. However, when depth information is extracted from a plurality of pixels in the 2D array image at the same time, repeatedly processing parts may be omitted by efficiently processing data management and memory allocation, thereby reducing a computation amount.

A waveform $P_e$ of general projection light having a period $T_e$ may be represented by Equation 1.

$$P_e^{(s)}(t) = a^{(s)} \sin(\omega t - \theta^{(s)}) + \overline{P}_{ave} \quad \text{(Equation 1)}$$

Here, s denotes an identifier for identifying different pieces of first projection to Nth projection light. For example, when N pieces of projection light is used, s=1, 2, ..., N. $\omega$ denotes an angular frequency of a waveform of the projection light and has a relationship of $\omega = 2\pi/T_e$. The variable $a^{(s)}$ denotes a magnitude of projection light (s), and $\theta^{(s)}$ denotes a phase of the projection light (s). The variable $\overline{P}_{ave}$ denotes a Direct Current (DC) offset value, which may exist in the projection light.

A waveform $P_r$ of reflection light coming back to the 3D image acquisition apparatus 100 with a phase difference $\Phi_{TOF}$ after reflecting the projection light from the object 200 may be represented by Equation 2.

$$P_r^{(s)}(t) = r[a^{(s)} \sin(\omega t - \theta^{(s)} - \varnothing_{TOF}) + \overline{P}_{ave}] + \overline{P}_a \quad \text{(Equation 2)}$$

Here, r denotes a reflectinity of an object surface, and $\overline{P}_a$ denotes an ambient light component incident on the 3D image acquisition apparatus 100 regardless of the projection light.

In addition, a waveform G of the optical modulation signal of the optical modulator 103 may be represented by Equation 3. In Equation 3, a coefficient c denotes a magnitude of the optical modulation signal, and $\overline{G}_{ave}$ denotes a DC offset value, which may exist in the optical modulation signal. It is assumed that the optical modulator 103 is controlled so that an angular frequency of the optical modulation signal has the same angular frequency $\omega$ as the projection light.

$$G(t) = c \sin(\omega t) + \overline{G}_{ave} \quad \text{(Equation 3)}$$

A waveform of light arriving at the image pickup device 105 by passing through the optical modulator 103 may be obtained by multiplying the reflection light of Equation 2 by the optical modulation signal of Equation 3. Thus, an instant waveform $I_{inst}$ of the light arriving at the image pickup device 105 may be represented by Equation 4.

$$I_{inst}^{(a)}(t) = P_r^{(s)}(t) \times G(t) = [ra^{(s)} \sin(\omega t - \theta^{(a)} - \varnothing_{TOF}) + (r\overline{P}_{ave} + \overline{P}_a)] \times [c \sin(\omega t) + \overline{G}_{ave}] \quad \text{(Equation 4)}$$

The image pickup device 105 may generate an image by receiving incident light for a predetermined exposure time T. Thus, an image generated in each pixel of the image pickup device 105 is the same as a value obtained by integrating the instant waveform represented in Equation 4 for the time T. Here, the exposure time T may be the same as a period of a sub-frame. For example, if capturing is performed at a speed of 30 frames per second, with each frame having N sub-frames, the exposure time T may be about 0.033/N seconds. Although a predetermined conversion ratio between light intensity arriving at the image pickup device 105 and an output value of the image pickup device 105 may exist according to sensitivity of the image pickup device 105, an output image $I_{CCD}$ of the image pickup device 105 may be defined as Equation 5 by simplifying the conversion ratio for convenience of description.

$$I_{CCD}^{(s)} \equiv \frac{2}{T} \int_0^T I_{inst}^{(s)}(t) dt \quad \text{(Equation 5)}$$

When an image is defined in Equation 5, it is assumed that a scale factor between intensity of light incident on the image pickup device 105 and an output value of the image pickup device 105 is 1. Thus, in an actual computation, it is necessary that the scale factor is determined through calibration of the image pickup device 105 and applied to Equation 5. However, since an actual value of the scale factor does not harm the generality of the equations below, it is assumed in Equation 5 for convenience of description that the scale factor is 1.

In general, the period $T_e$ (e.g., 25 ns) of the projection light is much less than the exposure time T (e.g., 0.033/N seconds) of the image pickup device 105. Thus, when the integration is performed in Equation 5, DC terms of Equation 4 are dominantly contributed, and since AC terms of Equation 4 are almost cancelled due to negative and positive numbers, the AC terms contribute much less to an integration result than the DC terms. Thus, if Equation 4 is substituted into Equation 5 by considering only the DC terms of Equation 4, Equation 6 may be obtained. A detailed inducing process to obtain Equation 6 is omitted.

$$I_{CCD}{}^{(a)} = a^{(a)} rc \cdot \cos(\theta^{(a)} + \varnothing_{TOF}) + 2(r\overline{P}_{ave} + \overline{P}_a)\overline{G}_{ave} \quad \text{(Equation 6)}$$

In Equation 6, a first term of the right term is a function of a phase delay $\Phi_{TOF}$, which is an unknown quantity, a second term is a constant term of unknown quantities not associated with the phase delay. Thus, the image $I_{CCD}$ may be arranged as a sum of the term associated with the phase delay, which is an unknown quantity, and the constant term not associated with the phase delay. Here, for convenience of description, the constant term not associated with the phase delay may be represented by Equation 7.

$$\overline{B} = 2(r\overline{P}_{ave} + \overline{P}_a)\overline{G}_{ave} \quad \text{(Equation 7)}$$

When depth information from which random noise is removed is extracted by using N images, N-order nonlinear simultaneous equations of the phase delay $\Phi_{TOF}$ as represented by Equation 8 may be obtained.

$$I_{CCD}{}^{(1)} = a^{(1)} rc \cdot \cos(\theta^{(1)} + \varnothing_{TOF}) + \overline{B}$$

$$I_{CCD}{}^{(2)} = a^{(2)} rc \cdot \cos(\theta^{(2)} + \varnothing_{TOF}) + \overline{B}$$

$$I_{CCD}{}^{(N)} = a^{(N)} rc \cdot \cos(\theta^{(N)} + \varnothing_{TOF}) + \overline{B} \quad \text{(Equation 8)}$$

Equation 9 may be obtained by removing a constant term $\overline{B}$, which is an unknown quantity, from the simultaneous equations and using a trigonometric function.

$$I_{CCD}^{(ij)} = rc \begin{bmatrix} A^{(ij)} \cos\varnothing_{TOF} - \\ B^{(ij)} \sin\varnothing_{TOF} \end{bmatrix} \quad \begin{cases} I_{CCD}^{(ij)} = I_{CCD}^{(i)} - I_{CCD}^{(j)} \\ A^{(ij)} = a^{(i)} \cos\theta^{(i)} - \\ a^{(j)} \cos\theta^{(j)} \\ B^{(ij)} = a^{(i)} \sin\theta^{(i)} - \\ a^{(j)} \sin\theta^{(j)} \end{cases} \quad \text{(Equation 9)}$$

$$I_{CCD}^{(jk)} = rc \begin{bmatrix} A^{(jk)} \cos\varnothing_{TOF} - \\ B^{(jk)} \sin\varnothing_{TOF} \end{bmatrix}$$

$$i, j, k = 1, 2, \ldots, N \quad i < j < k$$

Equation 10 is obtained by dividing $I_{CCD}{}^{(ij)}$ by $I_{CCD}{}^{(jk)}$ to remove an unknown quantity "rc" from Equation 9.

$$\frac{I_{CCD}^{(ij)}}{I_{CCD}^{(jk)}} = \frac{A^{(ij)} \cos\varnothing_{TOF} - B^{(ij)} \sin\varnothing_{TOF}}{A^{(jk)} \cos\varnothing_{TOF} - B^{(jk)} \sin\varnothing_{TOF}} \quad \text{(Equation 10)}$$

$$\rightarrow \frac{I_{CCD}^{(ij)}}{I_{CCD}^{(jk)}} = \frac{A^{(ij)} - B^{(ij)} \tan\varnothing_{TOF}}{A^{(jk)} - B^{(jk)} \tan\varnothing_{TOF}}$$

Equation 11 is obtained by arranging Equation 10 for tangent (tan) of $\Phi_{TOF}$.

$$\tan\varnothing_{TOF} = \quad \text{(Equation 11)}$$

$$\frac{I_{CCD}^{(ij)} A^{(jk)} - I_{CCD}^{(jk)} A^{(ij)}}{I_{CCD}^{(ij)} B^{(jk)} - I_{CCD}^{(jk)} B^{(ij)}} = \frac{I_{CCD}^{(i)} A^{(jk)} + I_{CCD}^{(j)} A^{(ki)} + I_{CCD}^{(k)} A^{(ij)}}{I_{CCD}^{(i)} B^{(jk)} + I_{CCD}^{(j)} B^{(ki)} + I_{CCD}^{(k)} B^{(ij)}}$$

Equation 12 is obtained by arranging Equation 11 for the phase delay $\Phi_{TOF}$.

$$\varnothing_{TOF} = \tan^{-1}\left(\frac{I_{CCD}^{(i)} A^{(jk)} + I_{CCD}^{(j)} A^{(ki)} + I_{CCD}^{(k)} A^{(ij)}}{I_{CCD}^{(i)} B^{(jk)} + I_{CCD}^{(j)} B^{(ki)} + I_{CCD}^{(k)} B^{(ij)}}\right) \quad \text{(Equation 12)}$$

$$\begin{cases} A^{(ij)} = a^{(i)} \cos\theta^i - a^{(j)} \cos\theta^{(j)} \\ B^{(ij)} = a^{(i)} \sin\theta^{(i)} - a^{(j)} \sin\theta^{(j)} \end{cases}$$

Here, (i, j, k) = (1, 2, ..., N), and i<j<k as in Equation 9. In Equation 12, the 3 images $I_{CCD}{}^{(i)}$, $I_{CCD}{}^{(j)}$ and $I_{CCD}{}^{(k)}$ are measured by the image pickup device 105, and the magnitude $a^{(j)}$ the phase $\theta^{(j)}$ of the projection light and are controlled through the light source driver 102 and are already known values. Thus, as known through Equation 12, the phase delay $\Phi_{TOF}$ may be obtained by using 3 images arranged in an ascending order and a magnitude and a phase of projection light. A plurality of solutions of Equation 12 may exist according to the number N of captured images, and depth information from which random noise is removed may be extracted by averaging the plurality of solutions of Equation 12.

For example, when N=3, that is, when a phase delay is obtained with only 3 sub-frame images, only if i=1, j=2, and k=3, (i, j, k)=(1, 2, ..., N), and i<j<k are satisfied. Thus, in this case, Equation 13 is a unique solution of Equation 12

$$\varnothing_{TOF} = \quad \text{(Equation 13)}$$

$$\tan^{-1}\left(\frac{I_{CCD}^{(1)} A^{(23)} + I_{CCD}^{(2)} A^{(31)} + I_{CCD}^{(3)} A^{(12)}}{I_{CCD}^{(1)} B^{(23)} + I_{CCD}^{(2)} B^{(31)} + I_{CCD}^{(3)} B^{(12)}}\right) = \tan^{-1}\frac{V}{U}$$

In Equation 13, $I_{CCD}{}^{(1)}$ denotes a first sub-frame image captured in a first sub-frame, $I_{CCD}{}^{(2)}$ denotes a second sub-frame image captured in a second sub-frame, and $I_{CCD}{}^{(3)}$ denotes a third sub-frame image captured in a third sub-frame. In addition, $A^{(23)}$, $A^{(31)}$, and ACS are weights respectively multiplied by the first to third sub-frame images in the numerator and may be previously obtained from the magnitude 'a' and phase θ of the projection light. In addition, $B^{(23)}$, $B^{(31)}$, and $B^{(12)}$ are weights respectively multiplied by the first to third sub-frame images in the denominator and may also be previously obtained from the magnitude 'a' and phase θ of the projection light. In Equation 13, V may be the first averaged image V obtained by averaging images weighted by weights $A^{(23)}$, $A^{(31)}$, and $A^{(22)}$, and U may be the second averaged image U obtained by averaging images weighted by other weights $B^{(23)}$, $B^{(31)}$, and $B^{(12)}$. Thus, as known through Equation 13, the phase delay $\Phi_{TOF}$ may be obtained from an arctangent value (arctan=$\tan^{-1}$) of a ratio (V/U) of the first averaged image V to the second averaged image U.

In addition, as known through Equation 13, at least 3 images captured by the image pickup device 105 may be needed to obtain a phase delay. However, since a unique solution exists when N=3, it may be difficult to average a plurality of solutions. Thus, random noise may not be able to be removed with 3 images, and thus at least 4 images may be needed to remove random noise through averaging a plurality of solutions.

When N=4, since $_4C_3$=4, Equation 12 has 4 solutions. That is, (i, j, k)=(1, 2, 3, 4), and i<j<k are satisfied when (i, j, k)=(1, 2, 3), (i, j, k)=(1, 2, 4), (i, j, k)=(1, 3, 4), and (i, j, k)=(2, 3, 4). Thus, these 4 solutions are represented by Equation 14.

$(i, j, k) = 1, 2,$ (Equation 14)

$$3 \to \phi_{TOF}^{(1)} = \tan^{-1}\left(\frac{I_{CCD}^{(1)}A^{(23)} + I_{CCD}^{(2)}A^{(31)} + I_{CCD}^{(3)}A^{(12)}}{I_{CCD}^{(1)}B^{(23)} + I_{CCD}^{(2)}B^{(31)} + I_{CCD}^{(3)}B^{(12)}}\right) =$$

$$\tan^{-1}\left(\frac{V^{(1)}}{U^{(1)}}\right)$$

$(i, j, k) = 1, 2, 4 \to \phi_{TOF}^{(2)} =$ $$\tan^{-1}\left(\frac{I_{CCD}^{(1)}A^{(24)} + I_{CCD}^{(2)}A^{(41)} + I_{CCD}^{(3)}A^{(12)}}{I_{CCD}^{(1)}B^{(24)} + I_{CCD}^{(2)}B^{(41)} + I_{CCD}^{(3)}B^{(12)}}\right) =$$

$$\tan^{-1}\left(\frac{V^{(2)}}{U^{(2)}}\right)$$

$(i, j, k) = 1, 3, 4 \to \phi_{TOF}^{(3)} =$ $$\tan^{-1}\left(\frac{I_{CCD}^{(1)}A^{(34)} + I_{CCD}^{(3)}A^{(41)} + I_{CCD}^{(4)}A^{(13)}}{I_{CCD}^{(1)}B^{(34)} + I_{CCD}^{(3)}B^{(41)} + I_{CCD}^{(4)}B^{(13)}}\right) =$$

$$\tan^{-1}\left(\frac{V^{(3)}}{U^{(3)}}\right)$$

$(i, j, k) = 2, 3, 4 \to \phi_{TOF}^{(4)} =$ $$\tan^{-1}\left(\frac{I_{CCD}^{(2)}A^{(34)} + I_{CCD}^{(3)}A^{(42)} + I_{CCD}^{(4)}A^{(23)}}{I_{CCD}^{(2)}B^{(34)} + I_{CCD}^{(3)}B^{(42)} + I_{CCD}^{(4)}B^{(23)}}\right) = \tan^{-1}\left(\frac{V^{(4)}}{U^{(4)}}\right)$$

If random noise does not occur in the 3D image acquisition apparatus 100, the 4 phase delays obtained from the 4 solutions in Equation 14 may have the same value. However, if random noise occurs in the 3D image acquisition apparatus 100, the 4 phase delays obtained from the 4 solutions in Equation 14 have values that are different from each other. In general, a method of removing random noise could include averaging the 4 phase delays. However, in this case, a computation amount is large since arctangent is calculated four times to obtain the 4 phase delays. Thus, a method capable of removing random noise with a computation amount similar to a case of N=3 is beneficial.

Figure 6:
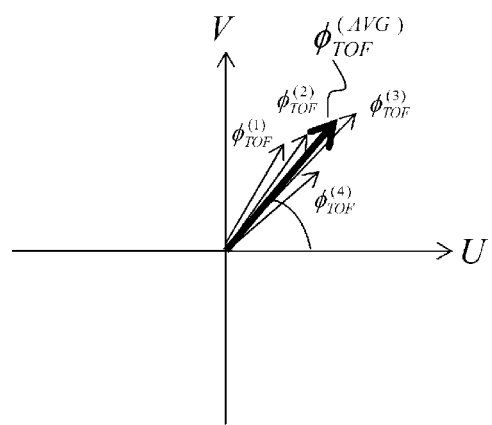
FIG. 6 is a graph showing a distribution of phase delays and an average phase delay when 4 pieces of projection light are used.

In Equation 14, by giving $V^{(k)}$ to a vector in a vertical axis direction on a vector plane and giving $U^{(k)}$ to a vector in a horizontal axis direction, a phase delay $\Phi_{TOF}^{(k)}$ (here, k=1 to 4) becomes an angle of rotation from a horizontal axis according to the definition of arctangent as shown in FIG. 6. In FIG. 6, an average phase delay $\Phi_{TOF}^{(AVG)}$ may be calculated from a mean vector of 4 vectors $[U^{(k)}, V^{(k)}]$ having dispersion due to random noise. This mean vector may be a value obtained by reducing the dispersion due to random noise. The mean vector may be represented by Equation 15.

$$[U, V] = \left[\frac{1}{N}\sum_{k=1}^{4} U^{(k)}, \frac{1}{N}\sum_{k=1}^{4} V^{(k)}\right]$$ (Equation 15)

Equation 16 is the average phase delay obtained by using Equation 14 and Equation 15. A detailed inducing process to obtain Equation 16 is omitted.

$$\phi_{TOF}^{(AVG)} = \tan^{-1}\left(\frac{\sum_{k=1}^{4} V^{(k)}}{\sum_{k=1}^{4} U^{(k)}}\right) = \tan^{-1}\left(\frac{\sum_{k=1}^{4} A_k I_{CCD}^{(k)}}{\sum_{k=1}^{4} B_k I_{CCD}^{(k)}}\right)$$ (Equation 16)

As shown in Equation 16, the average phase delay from which random noise removed may be calculated from a ratio of a first averaged image obtained by respectively multiplying 4 sequentially captured images by weights $A_1, A_2, A_3$, and $A_4$ and averaging the multiplication results and a second averaged image obtained by respectively multiplying the 4 images by weights $B_1, B_2, B_3$, and $B_4$ and averaging the multiplication results. Here, the weights $A_1, A_2, A_3$, and $A_4$ for the images captured by the image pickup device 105 are represented by Equation 17.

$$A_1 = A^{(23)} + A^{(24)} + A^{(34)}$$

$$A_2 = A^{(31)} + A^{(41)} + A^{(34)} \quad A^{(ij)} = a^{(i)} \cos \theta^{(i)} - a^{(j)} \cos \theta^{(j)}$$

$$A_3 = A^{(12)} + A^{(41)} + A^{(42)} \, B^{(ij)} = a^{(i)} \sin \theta^{(i)} - \sin \theta^{(j)}$$

$$A_4 = A^{(32)} + A^{(13)} + A^{(23)}$$ (Equation 17)

The weights $B_1, B_2, B_3$, and $B_4$ may also be obtained in the same way as the weights $A_1, A_2, A_3$, and $A_4$ of Equation 17. As shown in Equation 17, the weights $A_1, A_2, A_3, A_4, B_1, B_2, B_3$, and $B_4$ may be previously obtained from the magnitude 'a' and phase $\theta$ of the projection light. Thus, an average phase delay may be simply obtained with only an arctangent computation once by using Equation 16.

When N=5, since $_5C_3=10$, Equation 12 has 10 solutions. That is, (i, j, k)=(1, 2, 3, 4, 5), and i<j<k are satisfied when (i, j, k)=(1, 2, 3), (i, j, k)=(1, 2, 4), (i, j, k)=(1, 3, 4), (i, j, k)=(2, 3, 4), (i, j, k)=(1, 2, 5), (i, j, k)=(1, 3, 5), (i, j, k)=(2, 3, 5), (i, j, k)=(1, 4, 5), (i, j, k)=(2, 4, 5), and (i, j, k)=(3, 4, 5). Thus, these 10 solutions are represented by Equation 18.

$$\phi_{TOF}^{(1)} = \tan^{-1}\left(\frac{I_{CCD}^{(1)}A^{(23)} + I_{CCD}^{(2)}A^{(31)} + I_{CCD}^{(3)}A^{(12)}}{I_{CCD}^{(1)}B^{(23)} + I_{CCD}^{(2)}B^{(31)} + I_{CCD}^{(3)}B^{(12)}}\right) =$$ (Equation 18)

$$\tan^{-1}\left(\frac{V^{(1)}}{U^{(1)}}\right)$$

$$\phi_{TOF}^{(2)} = \tan^{-1}\left(\frac{I_{CCD}^{(1)}A^{(24)} + I_{CCD}^{(2)}A^{(41)} + I_{CCD}^{(3)}A^{(12)}}{I_{CCD}^{(1)}B^{(24)} + I_{CCD}^{(2)}B^{(41)} + I_{CCD}^{(3)}B^{(12)}}\right) =$$

$$\tan^{-1}\left(\frac{V^{(2)}}{U^{(2)}}\right)$$

$$\phi_{TOF}^{(3)} = \tan^{-1}\left(\frac{I_{CCD}^{(1)}A^{(34)} + I_{CCD}^{(3)}A^{(41)} + I_{CCD}^{(4)}A^{(13)}}{I_{CCD}^{(1)}B^{(34)} + I_{CCD}^{(3)}B^{(41)} + I_{CCD}^{(4)}B^{(13)}}\right) =$$

$$\tan^{-1}\left(\frac{V^{(3)}}{U^{(3)}}\right)$$

$$\phi_{TOF}^{(4)} = \tan^{-1}\left(\frac{I_{CCD}^{(2)}A^{(34)} + I_{CCD}^{(3)}A^{(42)} + I_{CCD}^{(4)}A^{(23)}}{I_{CCD}^{(2)}B^{(34)} + I_{CCD}^{(3)}B^{(42)} + I_{CCD}^{(4)}B^{(23)}}\right) =$$

$$\tan^{-1}\left(\frac{V^{(4)}}{U^{(4)}}\right)$$

$$\phi_{TOF}^{(5)} = \tan^{-1}\left(\frac{I_{CCD}^{(1)}A^{(25)} + I_{CCD}^{(2)}A^{(51)} + I_{CCD}^{(5)}A^{(12)}}{I_{CCD}^{(1)}B^{(25)} + I_{CCD}^{(2)}B^{(51)} + I_{CCD}^{(5)}B^{(12)}}\right) =$$

$$\tan^{-1}\left(\frac{V^{(5)}}{U^{(5)}}\right)$$

$$\phi_{TOF}^{(6)} = \tan^{-1}\left(\frac{I_{CCD}^{(1)}A^{(35)} + I_{CCD}^{(3)}A^{(51)} + I_{CCD}^{(5)}A^{(13)}}{I_{CCD}^{(1)}B^{(35)} + I_{CCD}^{(3)}B^{(51)} + I_{CCD}^{(5)}B^{(13)}}\right) =$$

$$\tan^{-1}\left(\frac{V^{(6)}}{U^{(6)}}\right)$$

-continued $$\phi_{TOF}^{(7)} = \tan^{-1}\left(\frac{I_{CCD}^{(2)}A^{(35)} + I_{CCD}^{(3)}A^{(52)} + I_{CCD}^{(5)}A^{(23)}}{I_{CCD}^{(2)}B^{(35)} + I_{CCD}^{(3)}B^{(52)} + I_{CCD}^{(5)}B^{(23)}}\right) =$$
$$\tan^{-1}\left(\frac{V^{(7)}}{U^{(7)}}\right)$$

$$\phi_{TOF}^{(8)} = \tan^{-1}\left(\frac{I_{CCD}^{(1)}A^{(45)} + I_{CCD}^{(4)}A^{(51)} + I_{CCD}^{(5)}A^{(14)}}{I_{CCD}^{(1)}B^{(45)} + I_{CCD}^{(4)}B^{(51)} + I_{CCD}^{(5)}B^{(14)}}\right) =$$
$$\tan^{-1}\left(\frac{V^{(8)}}{U^{(8)}}\right)$$

$$\phi_{TOF}^{(9)} = \tan^{-1}\left(\frac{I_{CCD}^{(2)}A^{(45)} + I_{CCD}^{(4)}A^{(52)} + I_{CCD}^{(5)}A^{(24)}}{I_{CCD}^{(2)}B^{(45)} + I_{CCD}^{(4)}B^{(52)} + I_{CCD}^{(5)}B^{(24)}}\right) =$$
$$\tan^{-1}\left(\frac{V^{(9)}}{U^{(9)}}\right)$$

$$\phi_{TOF}^{(10)} = \tan^{-1}\left(\frac{I_{CCD}^{(3)}A^{(45)} + I_{CCD}^{(4)}A^{(53)} + I_{CCD}^{(5)}A^{(34)}}{I_{CCD}^{(3)}B^{(45)} + I_{CCD}^{(4)}B^{(53)} + I_{CCD}^{(5)}B^{(34)}}\right) =$$
$$\tan^{-1}\left(\frac{V^{(10)}}{U^{(10)}}\right)$$

Like in a case where N=4, Equation 19 is an average phase delay obtained by using Equation 18 and Equation 15. A detailed inducing process to obtain Equation 19 is omitted.

$$\phi_{TOF}^{(AVG)} = \tan^{-1}\left(\frac{\sum_{k=1}^{10} V^{(k)}}{\sum_{k=1}^{10} U^{(k)}}\right) = \tan^{-1}\left(\frac{\sum_{k=1}^{5} A_k I_{CCD}^{(k)}}{\sum_{k=1}^{5} B_k I_{CCD}^{(k)}}\right) \quad \text{(Equation 19)}$$

Here, weights $A_1, A_2, A_3, A_4,$ and $A_5$ of images captured by the image pickup device 105 are represented by Equation 20.

$$A_1 = A^{(23)} + A^{(24)} + A^{(34)} + A^{(25)} + A^{(35)} + A^{(45)}$$

$$A_2 = A^{(31)} + A^{(41)} + A^{(34)} + A^{(51)} + A^{(35)} + A^{(45)}$$

$$A_3 = A^{(12)} + A^{(41)} + A^{(42)} + A^{(51)} + A^{(52)} + A^{(45)}$$

$$A_4 = A^{(12)} + A^{(13)} + A^{(23)} + A^{(51)} + A^{(52)} + A^{(53)}$$

$$A_5 = A^{(12)} + A^{(13)} + A^{(23)} + A^{(14)} + A^{(24)} + A^{(34)} \quad \text{(Equation 20)}$$

As shown in Equation 20, a weight $A_k$ is a sum of a numerical progression $A^{(ij)}$ having regularity. That is, the weight $A_k$ is a sum of the numerical progression $A^{(ij)}$, and (i, j) indicates all combinations, which can be obtained by selecting in an ascending order two of four numbers remaining by excluding a $k^{th}$ value from (1, 2, 3, 4, 5). Here, the ascending order is determined in a method of circulating from a number coming next to k. For example, when k=2, two of four numbers, i.e., [3, 4, 5, 1], having the ascending order from a number coming next to 2 are selected in the ascending order. When k=4, two of four numbers, i.e., [5, 1, 2, 3], having the ascending order from a number coming next to 4 are selected in the ascending order. In a case of a weight $A_3$, since k=3, a result of selecting two of [4, 5, 1, 2] in the ascending order is [4, 5], [4, 1], [4, 2], [5, 1], [5, 2], [1, 2]. Thus, $A_3 = A^{(4,5)} + A^{(4,1)} + A^{(4,2)} + A^{(5,1)} + A^{(5,2)} + A^{(1,2)}$. A weight $B_k$ may be obtained in the same way as the weight $A_k$. That is, the weight $B_k$ is a sum of the numerical progression $B^{(ij)}$, and (i, j) indicates all combinations, which can be obtained by selecting in an ascending order two of four numbers remaining by excluding a $k^{th}$ value from (1, 2, 3, 4, 5). Values of $A^{(ij)}$ and $B^{(ij)}$ may be previously obtained from the magnitude 'a' and phase θ of the projection light. Thus, an average phase delay from which random noise is removed may be simply calculated from Equation 19. That is, an average phase delay in a general case of the number of images is N may be represented by Equation 21.

$$\phi_{TOF}^{(AVG)} = \tan^{-1}\left(\frac{\sum_{k=1}^{{}_N C_3} V^{(k)}}{\sum_{k=1}^{{}_N C_3} U^{(k)}}\right) = \tan^{-1}\left(\frac{\sum_{k=1}^{N} A_k I_{CCD}^{(k)}}{\sum_{k=1}^{N} B_k I_{CCD}^{(k)}}\right) \quad \text{(Equation 21)}$$

The weights $A_k$ and $B_k$ in Equation 21 may be generalized as in Equation 22.

$$A_k = \text{sum}[a^{(i)} \cos\theta^{(i)} - a^{(j)} \cos\theta^{(j)}; (i,j) \text{ is } {}_{N-1}C_2^{(\rightarrow k)} \text{ of } \{1:N\}]$$

$$B_k = \text{sum}[a^{(i)} \sin\theta^{(i)} - a^{(j)} \sin\theta^{(j)}; (i,j) \text{ is } {}_{N-1}C_2^{(\rightarrow k)} \text{ of } \{1:N\}] \quad \text{(Equation 22)}$$

In Equation 22, i and j are any one numbers of natural numbers 1 to N remaining by excluding k (i≠k, j≠k). Generally speaking about an arbitrary number N, the weight $A_k$ is a sum of the numerical progression $A^{(ij)}$, and (i, j) indicates all combinations, which can be obtained by arranging (N−1) numbers remaining by excluding k from natural numbers 1 to N in an ascending order circulating from a number coming next to k and selecting two of the (N−1) numbers in the ascending order. Here, a number coming next to N in the ascending order is 1. Thus, the (N−1) numbers may be arranged in the ascending order of (k+1, k+2, N−1, N, 1, 2, . . . , k−1). The weight $B_k$ may be obtained in the same way as the weight $A_k$.

The generalized weights $A_k$ and $B_k$ may be calculated by using predefined magnitude $a^{(i)}$ and phase $\theta^{(i)}$ of projection light and used to extract depth information in an operation of the 3D image acquisition apparatus 100. A table shown in FIG. 7 is an example of a result obtained by calculating the weights $A_k$ and $B_k$ of Equation 22 when N=3 to 10. In the table of FIG. 7, it is assumed that the magnitude of projection light is the same for any case and the phase is obtained by equally dividing 360° by N. For example, when N=3, phases $\theta^{(i-3)}$ are 0°, 120°, and 240°. In addition, in the table of FIG. 7, the weights $A_k$ and $B_k$ are normalized so that the maximum value is 1.

Like the table of FIG. 7, when pre-calculated weights are stored in a memory (not shown) of the 3D image acquisition apparatus 100, the depth image processor 107 does not have to newly calculate weights every time when the depth image processor 107 extracts depth information. The depth image processor 107 may read proper weights from the memory according to the number of captured images and perform a computation of respectively multiplying the images by the weights. Thus, since an average phase delay from which random noise is removed can be simply and quickly obtained, real-time extraction of depth information is possible. In addition, since a memory capacity and a computation amount required to remove the random noise can be significantly reduced, a size and a manufacturing cost of the 3D image acquisition apparatus 100 can be reduced. Although Weights for magnitudes and phases of projection light in one combination are shown in the table of FIG. 7, weights for magnitudes and phases of projection light in various combinations may be previously calculated. Accordingly, when depth information is extracted, the depth image processor 107 may read weights of a combination of a used magnitude and phase of projection light and a combination corresponding to the number of captured images and use the read weights to obtain an average phase delay. Here, the memory may be in the controller 106 or the depth image processor 107 or may be a separate storage device.

When the average phase delay is obtained in the above-described method, distances (depths) between the 3D image acquisition apparatus 100 and surfaces of the object 200 may be calculated by Equation 23.

$$\text{depth} = \frac{CT_e}{4\pi}\phi_{TOF}^{(AVG)} \quad \text{(Equation 23)}$$

In Equation 23, C denotes the velocity of light, and $T_e$ denotes a period of a waveform of projection light.

Figure 8:
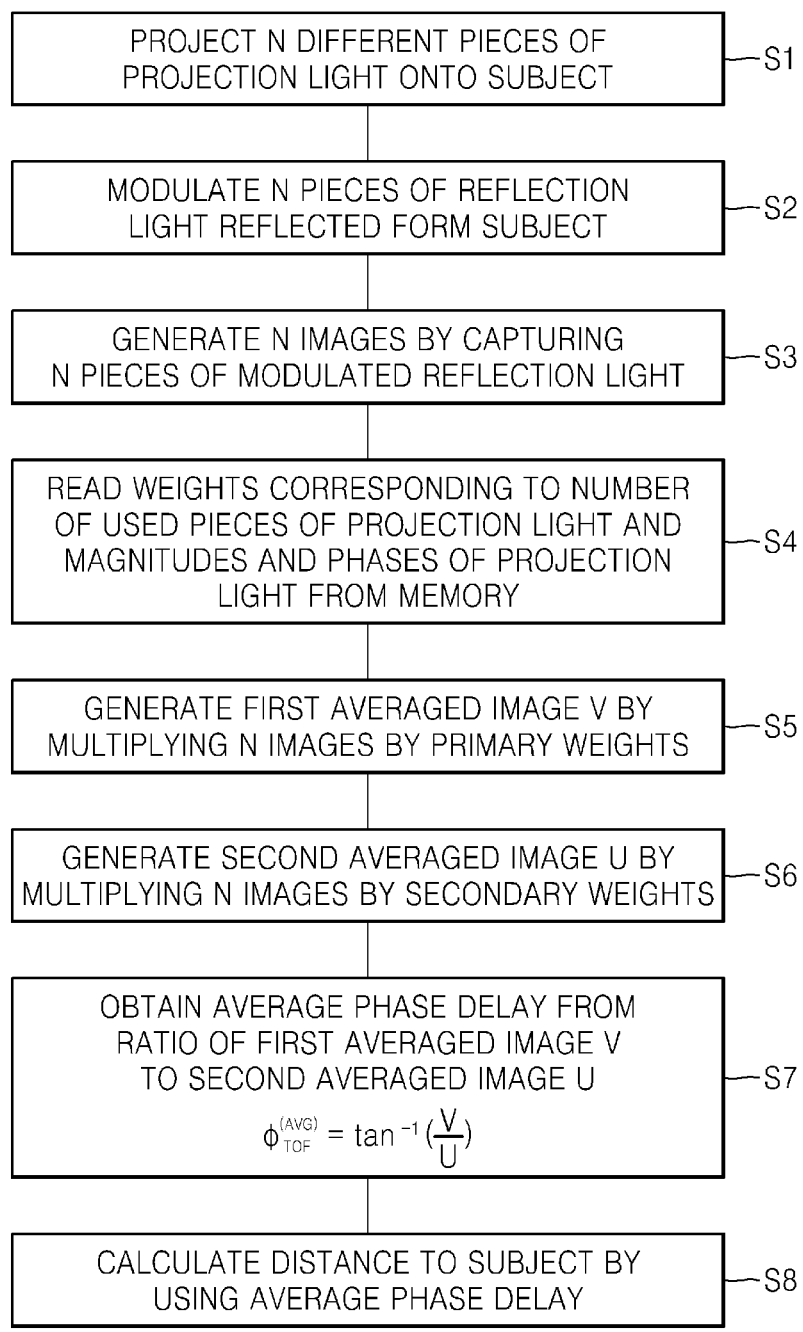
FIG. 8 is a flowchart of a depth information extracting method according to an exemplary embodiment.

FIG. 8 is a flowchart of a depth information extracting method according to an exemplary embodiment. Referring to FIG. 8, in operation S1, the light source 101 sequentially projects N different pieces of projection light onto the object 200 by being driven by the light source driver 102. Here, N may be a natural number equal to or greater than 3. The N different pieces of projection light may have waveforms having the same period and different magnitudes and phases. The N different pieces of projection light are reflected from the surfaces of the object 200 and are sequentially incident on the optical modulator 103 as N different pieces of reflection light. In operation S2, the optical modulator 103 is driven by the optical modulator driver 104 and modulates the N different pieces of reflection light reflected from the surfaces of the object 200 by using an optical modulation signal having a predetermined gain waveform. Here, the optical modulation signal may be a periodic wave having the same period as the projection light.

In operation S3, the image pickup device 105 generates N images by sequentially capturing the N pieces of modulated reflection light. The N images are delivered to the depth image processor 107. In operation S4, the depth image processor 107 reads predetermined weights $A_k$ and $B_k$, which are previously calculated; from the memory. As described above, the weights $A_k$ and $B_k$ may be determined according to the number N of used pieces of projection light, magnitudes of the N pieces of projection light, and phases of the N pieces of projection light. Various sets of weights $A_k$ and $B_k$ according to various combinations of the number N of pieces of projection light, magnitudes of the N pieces of projection light, and phases of the N pieces of projection light may are previously calculated and stored in the memory. The depth image processor 107 may search for and read weights corresponding to the number N of actually used pieces of projection light, magnitudes of the N pieces of projection light, and phases of the N pieces of projection light from among the various sets of weights $A_k$ and $B_k$ stored in the memory.

In operation S5, the depth image processor 107 obtains a first averaged image V by multiplying the N images by the primary weights $A_k$ respectively corresponding to the N images and summing the multiplication results as shown in Equation 21. For example, a first image is multiplied by a first primary weight $A_1$ corresponding to the first image, and an Nth image is multiplied by an Nth primary weight $A_N$ corresponding to the Nth image. Likewise, in operation S6, the depth image processor 107 obtains a second averaged image U by multiplying the N images by the secondary weights $B_k$ respectively corresponding to the N images and summing the multiplication results. In operation S7, the depth image processor 107 obtains an average phase delay from an arctangent value of a ratio (V/U) of the first averaged image V to the second averaged image U. In operation S8, a distance (depth) from the 3D image acquisition apparatus 100 to the object 200 is calculated by using Equation 23. According to an exemplary embodiment, even though the number N of images increases, since only multiplication and addition computations for obtaining the first averaged image V and the second averaged image U increase proportionally, an increase in the amount of computation is very small. Thus, very accurate depth information from which random noise is removed may be obtained with a relatively small computation amount.

Although the exemplary embodiment of using N different pieces of projection light is described in the flowchart of FIG. 8, as described above, N different optical modulation signals may be used instead of using the N different pieces of projection light. For example, the N different optical modulation signals may be periodic waves having the same period and waveform and different magnitudes or phases. Even in this case, N different images may be obtained from the image pickup device 105, and procedures of extracting depth information thereafter may be the same as operations S4 to S8. However, in operations S5 and S6, primary and secondary weights may be determined according to the magnitudes and phases of the optical modulation signals.

Meanwhile, the depth image processor 107 for calculating depth information from which random noise is removed by performing the computations described above may be implemented by a dedicated IC or software installed in a general-purpose computer device, such as a Personal Computer (PC), as described above. When the depth image processor 107 is implemented by software, the depth image processor 107 may be stored in a separate portable storage medium in a computer executable format.

Exemplary embodiments of a 3D image acquisition apparatus and a method of extracting depth information in the 3D image acquisition apparatus have been described and shown in the accompanying drawings. However, it should be understood that the exemplary embodiments described therein should be considered in a descriptive sense only and not for purposes of limitation. Descriptions of features or aspects within each exemplary embodiment should typically be considered as available for other similar features or aspects in other embodiments.

What is claimed is:

1. A depth information extracting method comprising:
    projecting N different pieces of projection light onto an object;
    modulating N pieces of reflection light reflected from the object with an optical modulation signal;
    generating N images by capturing the N pieces of modulated reflection light;
    generating a first averaged image by multiplying the N images by primary weights and generating a second averaged image by multiplying the N images by secondary weights;
    acquiring an average phase delay based on the first and second averaged images; and
    calculating a distance to the object based on the average phase delay.

2. The depth information extracting method of claim 1, wherein each of the N different pieces of projection light are periodic waves having the same period, and each of the N different pieces of projection light has at least one of a different magnitude and a different phase as compared to a magnitude and a phase of each of the other N different pieces of projection light.

3. The depth information extracting method of claim 2, wherein the optical modulation signal is a periodic wave having a period that is equal to the period of the N different pieces of projection light.

4. The depth information extracting method of claim 2, wherein phase differences obtained by dividing 360 degrees by N exist between each of the N pieces of reflection light.

5. The depth information extracting method of claim 1, wherein the first averaged image is obtained by multiplying the N images by primary weights respectively corresponding to the N images and summing results of the multiplying of the primary weights, and the second averaged image is obtained by multiplying the N images by secondary weights respectively corresponding to the N images and summing results of the multiplying of the secondary weights.

6. The depth information extracting method of claim 5, wherein the primary and secondary weights are calculated by using at least one of magnitudes and phases of the N pieces of projection light.

7. The depth information extracting method of claim 6, wherein $k^{th}$ primary and secondary weights corresponding to a $k^{th}$ image of the N images are $A_k$ and $B_k$, respectively, a magnitude of an $i^{th}$ projection light of the N different pieces of projection light is $a^{(i)}$, a phase of the $i^{th}$ projection light is $\theta^{(i)}$, and the $k^{th}$ primary and secondary weights are defined by, $$A_k = \text{sum}\lfloor a^{(i)} \cos\theta^{(i)} - a^{(j)}\cos\theta^{(j)}; (i,j) \text{ is }_{N-1}C_2^{(=k)} \text{ of } \{1:N\}\rfloor$$

$$B_k = \text{sum}[a^{(i)} \sin\theta^{(i)} - a^{(j)}\sin\theta^{(j)}; (i,j) \text{ is }_{N-1}C_2^{(=k)} \text{ of } \{1:N\}],$$

wherein i and j are any individual numbers excluding k from 1 to N and are defined as all combinations obtained by arranging (N−1) numbers remaining after excluding k in an ascending order circulating from a number adjacent to k and selecting 2 of the (N−1) numbers in the circulated ascending order.

8. The depth information extracting method of claim 6, wherein the primary and secondary weights are selected from a plurality of weights calculated for a plurality of combinations of magnitudes and phases of a plurality of pieces of projection light, including the N pieces of projection light.

9. The depth information extracting method of claim 8, wherein the generating of the first averaged image and the second averaged image uses weights corresponding to combinations of magnitudes and phases of the N pieces of projection light, from among the plurality of weights.

10. The depth information extracting method of claim 1, wherein the average phase delay is obtained from an arctangent value of a ratio of the first averaged image to the second averaged image.

11. The depth information extracting method of claim 1, further comprising:
additionally generating M new images by projecting M different pieces of projection light onto the object;
removing M oldest images of the N previous images;
generating first and second averaged images by multiplying the remaining N images by primary weights and secondary weights, respectively;
acquiring an average phase delay from the first and second averaged images; and
calculating a distance to the object from the average phase delay.

12. The depth information extracting method of claim 11, wherein N is a natural number equal to or greater than 3 and M is a natural number less than N.

13. The depth information extracting method of claim 1, wherein the projecting comprises sequentially projecting the N different pieces of projection light onto the object.

14. The depth information extracting method of claim 1, wherein N is a natural number equal to or greater than 3.

15. The depth information extracting method of claim 1, wherein the optical modulation signal has a gain waveform.

16. A depth information extracting method comprising:
projecting N identical pieces of projection light onto an object;
modulating N pieces of reflection light reflected from the object with N optical modulation signals having different gain waveforms, respectively;
generating N images by capturing the N pieces of modulated reflection light;
generating a first averaged image by multiplying the N images by primary weights and generating a second averaged image by multiplying the N images by secondary weights;
acquiring an average phase delay based on the first and second averaged images; and
calculating a distance to the object from the average phase delay.

17. The depth information extracting method of claim 16, wherein the N optical modulation signals are periodic waves having the same period, and each of the N optical modulation signals has at least one of a different magnitude and a different phase as compared to a magnitude and a phase of each of the other N optical modulation signals.

18. The depth information extracting method of claim 17, wherein the projection light is a periodic wave having a period that is equal to the period of the N optical modulation signals.

19. The depth information extracting method of claim 17, wherein phase differences obtained by dividing 360 degrees by N exist between each of the N optical modulation signals.

20. The depth information extracting method of claim 16, wherein the first averaged image is obtained by multiplying the N images by primary weights respectively corresponding to the N images and summing results of the multiplying of the primary weights, and the second averaged image is obtained by multiplying the N images by secondary weights respectively corresponding to the N images and summing results of the multiplying of the secondary weights.

21. The depth information extracting method of claim 20, wherein the primary and secondary weights are calculated by using at least one of magnitudes and phases of the N optical modulation signals.

22. The depth information extracting method of claim 16, wherein the average phase delay is obtained from an arctangent value of a ratio of the first averaged image to the second averaged image.

23. The depth information extracting method of claim 16, wherein the projecting comprises sequentially projecting the N identical pieces of projection light onto the object.

24. A 3 Dimensional (3D) image acquisition apparatus comprising:
a light source that projects at least three different pieces of projection light onto an object;
an optical modulator that modulates at least three pieces of light reflected from the object with an optical modulation signal;
an image pickup device that generates at least three images by capturing the light modulated by the optical modulator; and a depth image processor that calculates a distance to the object by using the at least three images generated by the image pickup device, wherein the depth image processor extracts depth information by generating a first averaged image by multiplying the at least three images by primary weights and generating a second averaged image by multiplying the at least three images by secondary weights;

acquiring an average phase delay based on the first and second averaged images; and calculating the distance to the object based on the average phase delay.

25. The 3D image acquisition apparatus of claim 24, further comprising:

a light source driver that controls a waveform of the projection light by driving the light source;

an optical modulator driver that controls a gain waveform of the optical modulation signal by driving the optical modulator; and a controller that controls operations of the light source driver, the optical modulator driver, and the image pickup device.

26. The 3D image acquisition apparatus of claim 24, further comprising:

a primary lens that concentrates the at least three pieces of light reflected from the object on a light incident surface of the optical modulator;

a filter disposed between the primary lens and the optical modulator that transmits only light having a predetermined wavelength to the optical modulator; and a secondary lens disposed between the optical modulator and the image pickup device that concentrates the modulated light into an area of the image pickup device.

27. The 3D image acquisition apparatus of claim 24, wherein the image pickup device uses a Charge Coupled Device (CCD) image sensor, a Complementary Metal Oxide Semiconductor (CMOS) image sensor, a photo diode array having a two-dimensional or one-dimensional array, or a single photo diode for measuring a distance to a single point.

28. The 3D image acquisition apparatus of claim 24, further comprising a memory which stores a plurality of weights corresponding to at least one of a plurality of combinations of a plurality of pieces of projection light, and a plurality of magnitudes of the optical modulation signal.

29. The 3D image acquisition apparatus of claim 28, wherein when depth information is extracted, the depth image processor reads weights corresponding to combinations of magnitudes and phases of the at least three different pieces of projection light projected onto the object by the light source, or the optical modulation signal from the memory and uses the read weights to calculate the depth information.

30. A 3 Dimensional (3D) image acquisition apparatus comprising:

a light source that projects at least three identical pieces of projection light onto an object;

an optical modulator that modulates at least three pieces of light reflected from the object with at least three optical modulation signals having different gain waveforms;

an image pickup device that generates at least three images by capturing the at least three pieces of light modulated by the optical modulator; and a depth image processor that calculates a distance to the object by using the image generated by the image pickup device, wherein the depth image processor extracts depth information by generating a first averaged image by multiplying the at least three images by primary weights and generating a second averaged image by multiplying the at least three images by secondary weights;

acquiring an average phase delay based on the first and second averaged images; and calculating the distance to the object from the average phase delay.

31. The 3D image acquisition apparatus of claim 30, wherein the at least three optical modulation signals are periodic waves having the same period, and each of the at least three optical modulation signals has at least one of a different magnitude and a different phase as compared to a magnitude and a phase of each of the other at least three optical modulation signals.

32. The 3D image acquisition apparatus of claim 31, wherein the at least three pieces of projection light are periodic waves having a period that is equal to the period of the at least three optical modulation signals.

33. The 3D image acquisition apparatus of claim 30, further comprising a memory which stores a plurality of weights corresponding to at least one of a plurality of combinations of a plurality of pieces of projection light, and a plurality of magnitudes and phases of optical modulation signals.

* * * * *